United States Patent [19]
Russ

[11] Patent Number: 5,190,503
[45] Date of Patent: Mar. 2, 1993

[54] GEARED ROTARY ACTUATOR WITH INTERNAL STOP MECHANISM

[75] Inventor: David E. Russ, Rockford, Ill.

[73] Assignee: Sundstrand Corporation, Rockford, Ill.

[21] Appl. No.: 808,447

[22] Filed: Dec. 16, 1991

[51] Int. Cl.$^5$ ............ F16D 11/08; F16D 11/12; F16D 43/26; F16H 35/10
[52] U.S. Cl. .................. 475/269; 475/311; 192/139; 192/148; 74/10.2
[58] Field of Search .......... 475/158, 269, 311; 192/1.38, 1.49, 35, 93 A, 138, 139, 148, 149; 74/10.2

[56] References Cited
U.S. PATENT DOCUMENTS

| | | | |
|---|---|---|---|
| 2,547,475 | 4/1951 | Larsen | 192/139 X |
| 2,844,038 | 7/1958 | Danta | 192/138 X |
| 3,140,618 | 7/1964 | Russell | 192/139 X |
| 3,333,477 | 8/1967 | Denkowski | 74/10.2 |
| 3,410,381 | 11/1968 | Henshaw et al. | 192/148 X |
| 3,635,319 | 1/1972 | Bleibtreu eet al. | 192/35 X |
| 4,043,226 | 8/1977 | Buuck | 192/93 A X |
| 4,621,717 | 11/1986 | Onodera et al. | 192/93 A X |
| 4,641,737 | 2/1987 | Gillingham et al. | 192/138 X |
| 4,930,611 | 6/1990 | Grimm | 192/139 |
| 4,932,511 | 6/1990 | Ames | 192/139 |

*Primary Examiner*—Leslie A. Braun
*Assistant Examiner*—David E. Henn
*Attorney, Agent, or Firm*—Wood, Phillips, VanSanten, Hoffman, & Ertel

[57] ABSTRACT

Weight and complexity concerns in geared rotary actuators and stop mechanisms for aircraft or the like may be minimized in the structure including a housing (18) adapted to be fixed to another structure, a rotatable input shaft (14) journalled by the housing (18), an output shaft (22, 28) journalled by the housing and a coupling between the input shaft (14) and the output shaft (22, 28) including at least one rotatable gear (42). The system includes a mechanical sensor (66) for sensing when the gear (42) has rotated close to an overtravel position and a first stop element (82) is associated with the input shaft (14) to be rotatable therewith. A second stop element (80) is movable into interfering relation with the first stop element (82) to stop rotation thereof and is carried by a gear part (19). Also included is an actuator (60, 62, 68, 70, 72) responsive to the sensor (66) for moving the second stop element (80).

11 Claims, 1 Drawing Sheet

U.S. Patent   Mar. 2, 1993   5,190,503
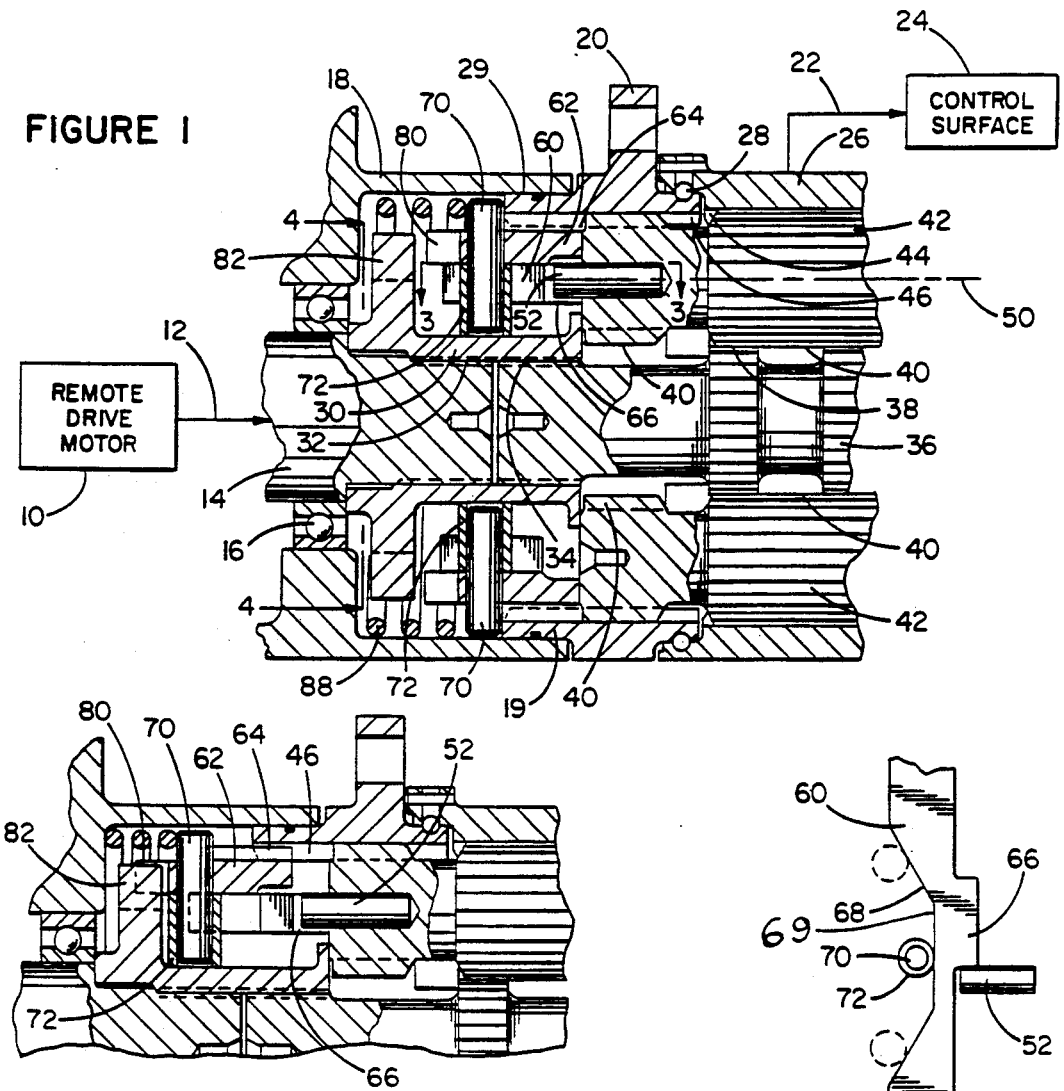
FIGURE 1
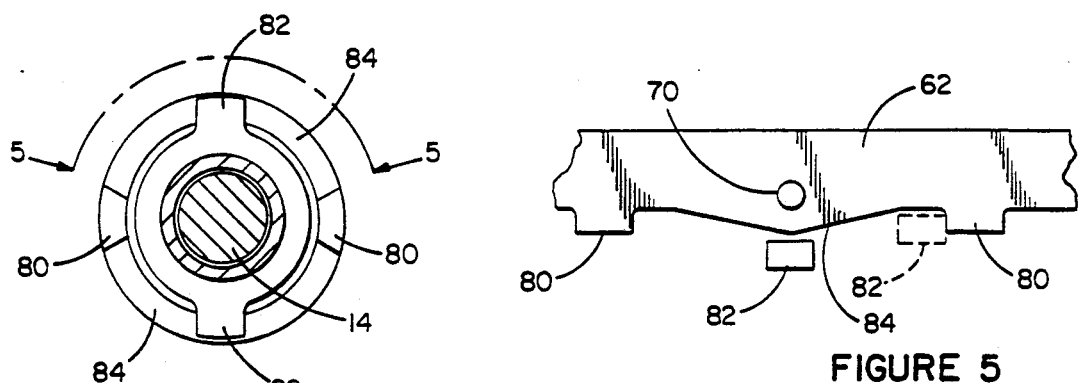
FIGURE 2
FIGURE 3
FIGURE 4
FIGURE 5

GEARED ROTARY ACTUATOR WITH INTERNAL STOP MECHANISM

FIELD OF THE INVENTION

This invention relates to geared rotary actuators as may be employed in a power train extending between a power drive unit or drive motor and an element whose position is to be moved as, for example, a control surface of an aircraft.

BACKGROUND OF THE INVENTION

Systems including power trains for actuating, for example, control surfaces on aircraft, and which require geared rotary actuators typically require high capacity overtravel stops. Such stops prevent system components from moving past positions defining the ends of a path of travel as a result of inertial loading within the system. In the usual case, most inertial energy in the system is located at the drive motor in the power drive unit. Consequently, the preferred location for a stop mechanism is remote from the motor so that shafting between the motor and the stops can provide a soft, spring-like action when the stops are engaged. In aircraft, this means that the stop mechanism should be located very close to the geared rotary actuator which in turn is in close proximity to the control surface to be moved. And, as in all aircraft situations, it is desirable that the system be light in weight as well as of small bulk and of minimal complexity to minimize cost and enhance reliability.

The present invention is directed to the provision that a geared rotary actuator incorporating an internal stop mechanism to achieve minimal cost, weight, bulk and complexity.

SUMMARY OF THE INVENTION

It is the principal object of the invention to provide a new and improved geared rotary actuator. More particularly, it is an object of the invention to provide a geared rotary actuator that incorporates an internal stop mechanism.

An exemplary embodiment of the invention achieves the foregoing objects in a geared rotary actuator which includes a housing adapted to be fixed to another structure, a rotatable input shaft journalled by the housing, an output shaft journalled by the housing and means including at least one gear rotatable within the housing coupling the input and output shafts. First and second stop elements are provided. One is carried by the input shaft and the other by the housing and the two are relatively movable into and out of an interference relation halting rotation of the input shaft in at least one, and preferably, both directions. Means are provided which include a lost motion connection between the gear and one of the stop elements for causing movement of the one stop element into the interference relation only upon predetermined rotation of the gear indicating that an overtravel position is being approached.

In a preferred embodiment, the first and second stop elements define a second lost motion connection. This allows axial movement of stop elements only during overtravel and provides the necessary dwell required by the geared rotary actuator.

In a highly preferred embodiment, the gear is a planet gear mounted for epicyclic movement within the housing toward and away from the overtravel position. The gear thus readily serves as a timing means for timing operation of the stop mechanism while maintaining its traditional function of coupling the input and output shafts.

The invention contemplates the provision of a mechanical sensor for sensing when the gear is rotated close to an overtravel position along with an actuator responsive to the sensor for moving one of the stop elements into interference relation with the other stop element.

In a preferred embodiment, a first ring-like element is located within the housing and the sensor is a formation on the ring-like element which is engageable with the gear when the gear is rotated close to the overtravel position. The actuator comprises a cam surface on the ring-like element which is operable to cam the second stop element into the interfering relation with the first stop element.

The invention contemplates that the first ring-like element be rotatable within the housing.

According to the invention, the second stop element includes a cam follower that is engageable with the cam surface. Means are provided to bias the second stop element away from the interfering relation as well as to bias the cam follower towards the cam surface.

According to a preferred embodiment, the second stop element is a ring-like element concentric with the input shaft and mounted within the housing for axial movement toward and away from the interfering relation and fixed within the housing against rotation relative thereto.

Preferably, a projection is mounted on the second ring-like element for interfering engagement with the first stop element and there is further provided a cam surface on the second ring-like element which is engageable with the first stop element for camming the second stop element away from the interfering relation when the gear is moving away from the overtravel position.

Other objects and advantages will become apparent from the following specification taken in connection with the accompanying drawings.

DESCRIPTION OF THE DRAWINGS

FIG. 1 is a partially sectional, partially schematic view of a system including geared rotary actuator including an internal stop mechanism made according to the invention and with the internal stops disengaged;

FIG. 2 is a fragmentary sectional view illustrating the stops in an engaged position;

FIG. 3 is a developed view of a mechanical sensor and associated cam surface and taken generally in the direction indicated by the line 3—3 in FIG. 1;

FIG. 4 is a sectional view taken approximately along the line 4—4 in FIG. 1; and FIG. 5 is a developed view illustrating that portion of the mechanism encompassed by the line 5—5 in FIG. 4.

DESCRIPTION OF THE PREFERRED EMBODIMENT

An exemplary embodiment of a geared rotary actuator with an internal stop mechanism is illustrated in the drawings and will be described herein in the environment of an aircraft, and its use in controlling the position of a control surface thereon. However, it is to be understood that the invention is not limited thereto, but may be employed with efficacy in any instance where a geared rotary actuator with overtravel stops is required.

Referring to FIG. 1, a remote drive motor or power drive unit (PDU) 10 is connected by shafting shown schematically at 12 to an input shaft 14 of the geared rotary actuator. Bearings 16 journal the shaft 14 for rotation within a housing 18 assembled to a geared rotary actuator gear part 19. The gear part 19 includes a mounting flange 20 by which it may be mounted to another structure such as part of an aircraft frame or the like.

As alluded to previously, the system includes an output arm 22 which may be connected to a control surface 24 or the like on an aircraft (not shown) for moving the same between any of a variety of positions. The output arm 22 is appropriately connected to an output ring gear 26 which is journalled as by bearings 28 and a pilot 29 to the gear part 19 to be coaxial with the shaft 14.

Within the gear part 19, a sleeve 30 is mounted to the shaft 14 for rotation therewith by means of interengaging splines 32. A set of interengaging splines 34 between the sleeve 30 and a sun gear 36 is also provided so that the sun gear is coaxial with and rotates with the shaft 14.

Teeth 38 on the sun gear 36 (which are only fragmentarily shown) are in engagement with teeth 40 of a plurality of planet gears 42 which are also within the gear part 19. The teeth 40 of the planet gears 42 are meshed with teeth 44 on the ring gear 26 as well as with stationary ring gear teeth 46 on the interior of the gear part 19. It will thus be appreciated that upon rotation of the shaft 14, the sun gear 36 will rotate and drive the planet gears 42. By reason of the fact that the planet gears are meshed with the fixed or stationary ring gear defined by the teeth 46, the planet gears 42 will undergo epicyclic movement within the housing and at the same time, will drive the output ring gear 26.

One of the planet gears 42, on its rotational axis 50, carries an axially projecting pin 52 which serves as a mechanical actuator. The pin 52 will, of course, track around the path of epicyclic movement of its associated planet gear 42 within the gear part 19 and thus serves as an indicator of the amount of rotary motion that has been outputted by the actuator via the ring gear 26, and the arm 22 to the control surface 24. In short, the position of the pin 52 is taken as an indication of how closely an overtravel position of the control surface 24 is being approached in either direction of rotation.

It will thus be appreciated that the gear system within actuator not only provides the usual power transmission function, but the same advantageously acts, as will be seen, as a timing means for operation of the stop mechanisms. Because the pin 52 and its indicating function are related to an element that undergoes epicyclic rotation rather than simple rotation about a fixed axis, a large number of revolutions of the input shaft 14 may be accommodated without the pin moving more than once to or through a position indicative of the approach of the overtravel position. This feature allows elimination of timing gearing in stop mechanisms heretofore employed, which timing gearing was in addition to the power transmission gearing, thereby reducing both weight and bulk.

Within the housing 18 is a first ring-like element 60. The first ring-like element 60 is disposed within a second ring-like element 62 which in turn is splined as by interengaging splines 64 to the gear part 19. In other words, the second ring-like element 62 may move axially within the gear part 19, but is prevented from rotating relative thereto. In contrast, no such limitation is imposed upon the first ring-like element 60 which may rotate freely within the second ring-like element 62 about the axis of the shaft 14.

As seen in FIG. 3, which is a partial developed view of the ring-like element 60, on its right hand side, it includes an axial projection 66. As can be seen in FIGS. 1 and 2, the projection 66 is radially spaced from the centerline of the shaft 14 approximately the same distance as the pin 52. Consequently, as the planet gear 42 carrying the pin 52 moves to a position closely approaching the overtravel position, the pin 52 will engage the projection 66 and rotate the first ring-like element 60.

On the side of the first ring-like element 60 opposite from the projection 64, a cam surface 68 is located. Note that the cam surface 68 includes a flat dwell section 69 for purposes to be seen. A pair of pins 70 that are directed radially are carried by the second ring-like element 62 and mount rollers 72 which engage the cam surface 68 and thus serve as cam followers. Thus, it can be appreciated from a consideration of FIG. 3 that rotation of the first ring-like element 60 as a result of contact between the pin 52 and the projection 66 will cause the second ring-like element 62 to be cammed to the left as viewed in FIGS. 1 and 2.

The second ring-like element 62, as seen in all but FIG. 3, carries a pair of axially directed stop elements 80 which are angularly spaced from one another by 180° and is concentric about the shaft 14. At the same time, the input shaft 14 includes a pair of radially projecting stops 82 which are also angularly spaced by 180°.

When the second ring-like element 62 is cammed to the left as viewed in FIGS. 1 and 2 as a result of the pin 52 engaging the projection 66 and the cam surface 68 operating against the roller 72, the stop elements 80 will be moved from the position illustrated in FIG. 1 to that illustrated in FIG. 2 which is into blocking relation or interfering relation with the stops 82. Because the second ring-like element 62 cannot rotate as a result of the restraint inherent in the use of the spline 64, further rotation of the shaft 14 in the direction that brought about engagement in the first place will be halted, thereby providing an overtravel stop. Reverse rotation of the shaft 14 will result in similar stopping action at the other end of the path of movement of the control surface 24.

The system is essentially completed by the presence of second cam surfaces 84 between the projections 80. Those skilled in the art will appreciate that the positive slope of the cam surfaces 84 will result in engagement of the cam surface 84 with the axially projecting stops 82 carried by the shaft 14 to cam the second ring-like element 62 to the right to ensure positive disengagement of the stops notwithstanding any tendency not to move in such direction as a result of wear, binding or corrosion.

Further, to assure such movement and prevent inadvertent stop engagement, a compression coil spring 88 is also disposed within the housing to act against the radially outer ends of the pins 70 and bias the second ring-like element 62 away from the path of movement of the radial projections 82 on the shaft 14.

An important feature of the invention is the fact that the orientation of the pin 52 and its association with a planet gear 42 in relation to the projection 66 establishes a first lost motion connection which provides a certain amount of the dwell required for the proper motion of the geared rotary actuator system. A second lost motion occurs between the roller 72 and the cam 68 as a result of the dwell section 69. In effect, a third lost motion connection is established by the relationship of the axial projections 80 on the second ring-like formation 62 and the radial projections 82 carried by the shaft 14 for the same purpose. Thus, sufficient lost motion is available to ensure that axial movement of the stops will occur only during overtravel.

The use of the cam surface 84 ensures proper disengagement of the stops when the actuator input reversed direction away from the stops position.

A number of additional advantages also accrue. As mentioned previously, the geared rotary actuator of the invention eliminates timing gears heretofore used in timing operation of a stop mechanism. It further minimizes cost and weight through the use of the ring gear teeth 46 as part of the interengaging splines 64 as can be appreciated from a consideration of FIGS. 1 and 2. The mounting flange 20 also provides additional weight and cost advantages by grounding both the gear rotary actuator and the stop mechanism.

The mechanism does not require additional bearings as might be required where the stop mechanism is separate from the geared rotary actuator. It will also be appreciated by incorporating the stop mechanism into the geared rotary actuator, a compact, low weight, high capacity stop mechanism has resulted which is simple to rig and which may be readily associated with an electrical sensor such as a switch or the like to sense stop engagement at both ends of the travel.

I claim:

1. A geared rotary actuator comprising:
   a housing adapted to be fixed to another structure;
   a rotatable input shaft journalled by said housing;
   an output shaft journalled by said housing;
   means including at least one gear rotatable within said housing coupling said input and output shafts;
   a mechanical sensor for sensing when said gear has rotated close to an overtravel position;
   a first stop element associated with said input shaft to rotate therewith;
   a second stop element movable into interfering relation with said first stop element to stop rotation thereof in at least one direction and carried by said housing;
   an actuator responsive to said sensor for moving said second stop element; and
   a ring-like element located within said housing; and
   said sensor being a formation on said ring-like element and engagable with said gear when said gear has rotated close to said overtravel position; and
   said actuator comprising a cam surface on said ring-like element and operable to cam said second stop element into said interfering relation.

2. The geared rotary actuator of claim 1 wherein said ring-like element is rotatable within said housing.

3. The geared rotary actuator of claim 1 wherein said second stop element includes a cam follower engageable with said cam surface, and means biasing said second stop element away from said interfering relation and said cam follower toward said cam surface.

4. A geared rotary actuator comprising:
   a housing adapted to be fixed to another structure;
   a rotatable input shaft journalled by said housing;
   an output shaft journalled by said housing;
   means including at least one gear rotatable within said housing coupling said input and output shafts;
   a mechanical sensor for sensing when said gear has rotated close to an overtravel position;
   a first stop element associated with said input shaft to rotate therewith;
   a second stop element movable into interfacing relation with said first stop element to stop rotation thereof in at least one direction and carried by said housing; and
   an actuator responsive to said sensor for moving said second stop element;
   said gear undergoing epicyclic movement within said housing and carrying a formation engageable with said sensor.

5. A geared rotary actuator comprising:
   a housing adapted to be fixed to another structure;
   a rotatable input shaft journalled by said housing;
   an output shaft journalled by said housing;
   means including at least one gear rotatable within said housing coupling said input and output shafts;
   a mechanical sensor for sensing when said gear has rotated close to an overtravel position;
   a first stop element associated with said input shaft to rotate therewith;
   a second stop element movable into interfacing relation with said first stop element to stop rotation thereof in at least one direction and carried by said housing; and
   an actuator responsive to said sensor for moving said second stop element;
   said second stop element being a ring-like element concentric with said input shaft and mounted within said housing for axial movement toward and away from said interfering relation and fixed within said housing against rotation relative thereto.

6. The geared rotary actuator of claim 5 wherein a projection is mounted on said ring-like element for interfering engagement with said first stop and further including a cam surface on said ring-like element and engageable with said first stop element for camming said second stop element away from said interfering relation when said gear is moving away from said overtravel position.

7. A geared rotary actuator comprising:
   a housing adapted to be fixed to another structure;
   a rotatable input shaft journalled by said housing;
   a sun gear within said housing and coaxial with said input shaft;
   means drivingly connecting said sun gear to said input shaft;
   a rotatable output shaft journalled by said housing and including a rotatable ring gear coaxial with said input shaft;
   a fixed ring gear in said housing;
   at least one planet gear in said housing between said sun gear and said ring gears and meshed with said sun gear and both said ring gears and undergoing epicyclic motion upon rotation of said input shaft toward or away from an overtravel position;
   a position indicating formation movable in said housing with said planet gear to provide a mechanical indication of the position of said planet gear in relation to said overtravel position;
   a mechanical sensor including a first ring-like element rotatable within said housing about said input shaft and having a sensing formation complimentary to said position indicating formation and arranged such that movement of said planet gear close to said overtravel position will cause rotation of said first ring-like element within said housing;

a first cam surface on said first ring-like element;

a second ring-like element in said housing about said input shaft and mounted thereon to be fixed against rotation while being axially movable along said shaft;

a cam follower on said second ring-like element and engageable with said first cam surface;

a radially directed stop tab carried by said input shaft to be rotatable therewith in a path in proximity to said second ring-like element;

an axially directed stop tab carried by said second ring-like element and movable therewith into said path and;

a spring in said housing biasing said second ring-like element away from said path.

8. The geared rotary actuator of claim 7 further including a second cam surface on said second ring-like element and disposed to be engaged by said radially directed stop tab to cam said second ring-like element away from said path when said planet gear is moving away from said overtravel position.

9. A geared rotary actuator comprising:

a housing adapted to be fixed to another structure;

a rotatable input shaft journalled by said housing;

an output shaft journalled by said housing;

means including at least one gear rotatable within said housing coupling said input and output shafts;

first and second stop elements, one carried by said input shaft and the other by said housing, and relatively movable into and out of an interference position halting rotation of said input shaft in one direction; and means, including a lost motion connection between said gear and one of said stop elements, for causing movement of said one stop element into said interference position only upon predetermined rotation of said gear indicating that an overtravel position is being approached.

10. The geared rotary actuator of claim 9 wherein said first and second stop elements define a second lost motion connection.

11. The geared rotary actuator of claim 10 wherein said gear is a planet gear mounted for epicyclic movement within said housing toward and away from said overtravel position.

* * * * *